TELEPHONE MESSAGE UNIT RECORDING SYSTEM

Filed June 5, 1961

2 Sheets-Sheet 1

INVENTORS L. FREERICKS
H. L. KUKASCH
T. B. LUZON
BY S. E. Hollander
ATTORNEY

INVENTORS L. FREERICKS
H. L. KUKASCH
T. B. LUZON
BY S E Hollander
ATTORNEY

United States Patent Office 3,156,773

Patented Nov. 10, 1964

3,156,773

TELEPHONE MESSAGE UNIT RECORDING SYSTEM

Lambert Freericks, Hasbrouck Heights, N.J., and Herbert L. Kukasch, New York, and Thomas B. Luzon, Bayside, N.Y., assignors to American Telephone and Telegraph Company, New York, N.Y., a corporation of New York Filed June 5, 1961, Ser. No. 114,916
13 Claims. (Cl. 179—7)

Figure 1:
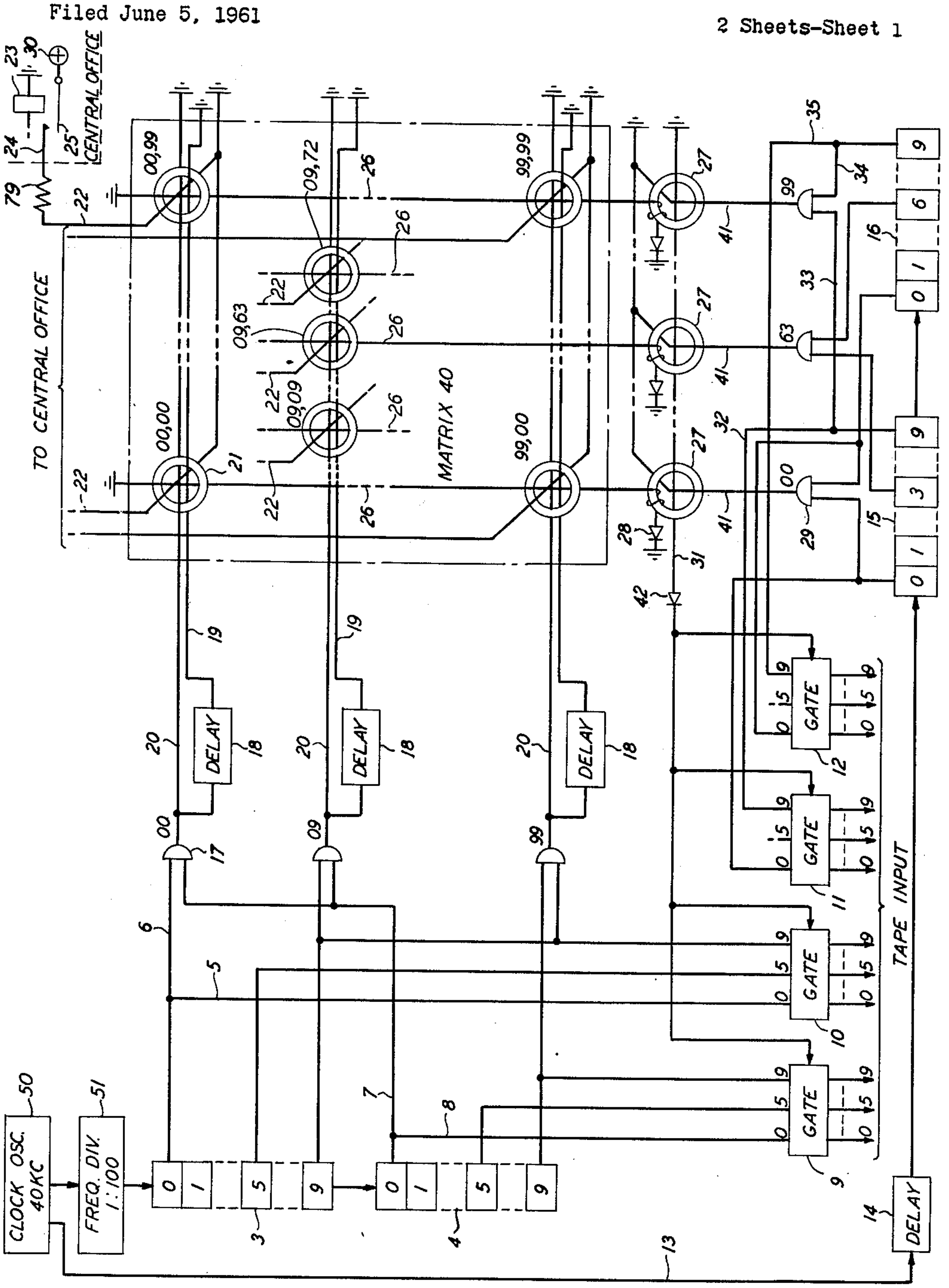

This invention relates to telephone message unit recording devices and, more particularly, to magnetic core matrix arrays to be incorporated therewith.

It is often necessary for billing purposes to register each message unit of a telephone subscriber. These message units originating as pulses in the central office, may represent, for example, indications of the initial charge for a particular call or an elapsed time interval during which a subscriber has been using his telephone.

In present day central offices registration of these message units is often accomplished by providing a message register or cyclometer for each subscriber. The pulses, representing message units to be billed, step the count of the message register by one digit, the message register being read each month to determine the total number of message units to be billed the subscriber.

In our copending application Serial No. 125,308, filed May 29, 1961, an improved registration system is disclosed wherein the subscriber message unit pulses set respective magnetic cores arranged in a matrix array. A scanning circuit determines which subscriber cores have been set by message unit pulses and causes this information to be recorded on a common magnetic tape.

The circuit disclosed in the above copending application and a number of other conventional magnetic core matrices which are utilized for subscriber billing and traffic purposes, although completely operative and advantageous, have certain inherent limitations.

In part, this is attributable to the improved responsiveness and enhanced sensitivity of the magnetic core message billing units as compared to the relay facilities heretofore employed. As is often the case in the wake of any substantial advance in telephone switching technology, certain problems are generated which must be transcended before the technological advance can be fully exploited.

Specifically, in the case of a magnetic core matrix billing array which is responsive to the operation of electromechanical relays in conjunction with the billing of individual subscriber operations (referred to herein as message units), there is a possibility of inaccurate registration in the cores as the result of the phenomenon of relay "chatter"—the uncontrolled bouncing of relay contacts after a closure operation has been initiated. This chatter persists for approximately 10 milliseconds until the contacts stabilize.

The threat inherent in the possible response of a sensitive device such as a magnetic core billing array to relay chatter is evident. In short, if the operation of the array is predicated on the setting of a core associated with an individual subscriber in response to the energization of a particular relay, it is conceivable that the array will "see" the bounce or chatter of the relay contacts as a separate billable signal.

The problem presented by the relay chatter may be best understood by consideration of a related problem and a popular solution to it. The message unit pulses for setting the subscriber cores originate in the local central office. When a particular subscriber is to be charged a message unit, a relay is operated and its contacts connect a current source to the conductor coupled to the respective subscriber core. This source sets the core which is later scanned by the scanning equipment. The scanning circuit resets the core and by so doing the subscriber is billed one message unit.

The scanning circuit often has a period smaller than the width of a message unit pulse. It is evident that in such a case it is possible for a subscriber to be billed twice for the same message unit. The message unit pulse sets the core, it is reset by the scanning circuit and is then set once again by the message unit pulse still applied. In actuality, if the width of the message unit pulse is many times greater than the period of the scanning cycle the core will be set and reset many times for the same message unit pulse.

This difficulty is popularly overcome by limiting the magnitude of the reset pulse. The pulse amplitude is adjusted to a value which is sufficient to reset a core only in the absence of the application of a message unit pulse. The message unit and reset pulses apply oppositely directed magnetomotive forces to the cores. Either one alone can switch the magnetization of the core but the two of them applied simultaneously are made to have no effect on the magnetization state of the core. Thus, when the message unit pulse is first applied the subscriber core is set. During the succeeding scanning cycles while the message unit is still applied, the reset pulses are unable to reset the cores. The only pulse that can reset the core is the first reset pulse applied after the termination of the message unit pulse.

With this background, the problem presented by the relay chatter is apparent. The instantaneous application of the message unit pulse sets the core. The core should not be reset until the message unit pulse is terminated and this in fact will occur if the message unit pulse is continuously applied and the reset pulse is limited in magnitude as above. However, for approximately 10 milliseconds after the initiation of the message unit pulse the relay contacts bounce back and forth. If by chance a reset pulse is applied to the core at a moment when the relay contacts are disconnected and the message unit pulse is therefore not being applied, the core is reset. After 10 milliseconds the contacts have stabilized and when the contacts close the message unit pulse is applied to the core once again. The core is set for a second time by the same message unit pulse and the subscriber is billed twice for the same message unit.

This relay chatter double billing problem is further aggravated since the message unit pulses and the reset pulses are uncorrelated, that is, the former may be applied at random times with respect to the latter. The scanning reset pulses are applied at fixed times determined by the scanning circuit. The message unit pulses, on the other hand, are applied at times determined, among other things, by the length of a subscriber call when it was begun, etc.

It is necessary to avoid the resetting of a subscriber core within the first few milliseconds after a message unit pulse is applied to preclude double billing. Because there is no time dependence between message unit and reset pulse application times, the most widespread solution to this problem is a very inefficient one. What is done is to inhibit the scanning circuit for a time equal to the relay chatter period when a message unit pulse is first applied to any core of the array. By so doing, there is no danger that the scanning circuit will reset the core during the relay chatter period as no reset pulses are applied. All message unit pulses set the respective cores to which they are directed. The instant they are applied the scanning circuit ceases to function. After the relay contacts stabilize and the message unit pulse is continuously applied the scanning circuit resumes functioning. As the message unit pulse is continuously applied to the core the subsequent reset pulses are unable to change the magnetization state of the core. Only the first reset pulse that is applied to the core after the termination of the message unit pulse resets the core and charges the subscriber one message unit. In this manner the central office subscribers are assured that they will be billed only once for each message unit.

This restriction not only complicates the resulting circuitry but can seriously limit the size of the array. That the scanning circuit is more complex is a result of the inhibiting mechanism by which the scanning circuit stops functioning for approxmately 10 milliseconds upon the origination of any message unit pulse. The more serious difficulty with this type of scanning circuit, however, is the limitation placed on the size of the array. There is an upper limit to the scanning period determined by the minimum interval between the application of message unit pulses to an individual subscriber core by the central office. The scanning period must be less than this time interval, for if not, some message units will go unrecorded. A first message unit pulse sets a subscriber core and if no reset pulse is applied before the next message unit pulse to the same subscriber there is no change in the magnetization state of the core and the first pulse will not result in a billing unit. For this reason it is necessary to scan each core of the array at least as frequently as the arrival of message unit pulses. This sets an upper limit on the period of the scanning circuit.

The number of cores in the array directly affects the length of the scanning period, the two increasing together. If it is necessary to continuously inhibit the scanning circuit every time a message unit pulse is applied, in order to maintain the upper limit on the scanning period it is apparent that the array must contain fewer cores. During certain times of the day a maximum number of subscribers are using their telephones, many message unit pulses are being applied to cores in the array, and the scanning circuit is inhibited most often. Since the upper limit on the scanning period must be maintained at all times, telephone usage at this time of day necessitates a great reduction in the number of cores that can be contained in the array. It may even be necessary to provide more than one array with the consequent additional and costly scanning equipment to provide adequate billing facilities for all subscribers of the central office.

It is therefore an object of this invention to provide an improved memory core message unit recording system for a telephone central office.

It is another object of this invention to provide a scanning sequence for a magnetic core matrix array with a reduced period of operation.

It is another object of this invention to preclude the erroneous billing of telephone subscribers arising from relay chatter effects.

It is still another object of this invention to provide a solution to the relay chatter problem without necessitating the inhibiting of the scanning circuit each time a message unit pulse is applied.

These and other objects are achieved in an illustrative embodiment of our invention by providing means that permit the setting of a core only during a predetermined interval of time subsequent to its scan. This interval is made to occur only when reset pulses are not being applied to the core. Subsequent reset pulses are not applied until the chatter of the setting relay has completely subsided. A reset pulse, therefore, can never be applied to a core that has just been set during the relay chatter period.

This is achieved in our invention by making the message unit pulses insufficient in magnitude to set any core. Shortly after a core is scanned, a bias current is applied to it. This current is also insufficient to effect the setting of the core. However, the coincidence of a message unit pulse and the bias pulse is sufficient to set the core. Accordingly, a core to which a message unit pulse is applied is set shortly after the row scan. This is the only time during which the core can be set.

If a message unit pulse is applied to a core in the short time between a reset pulse and the bias pulse the core is not set. When the bias pulse is applied the combination of the message unit and bias pulses set the core. The core is reset by the scanning circuit when the message unit pulse is finally terminated.

If the message unit pulse is applied, on the other hand, between the bias pulse and the next reset pulse the core is not set. The next reset pulse has no effect and the succeeding bias pulse together with the message unit pulse which is still applied sets the core. The core is reset by the scanning circuit when the message unit pulse has terminated.

The problem normally presented by the relay chatter is that a core will be set instantaneously upon the application of the message unit pulse, reset by an immediately occurring scanning reset pulse, and set once again by the message unit pulse upon the next closure of the relay contacts. The problem is completely avoided in our invention because it is impossible for a reset pulse to be applied to the core within the first 10 milliseconds after the setting of a core by a message unit pulse. Although there is no time correlation between the message unit and reset pulses, in our invention it is nevertheless impossible for a scan pulse to reset a core during the relay chatter period of a message unit pulse. Since the core can be set only when the bias pulse is applied and since the bias pulse is applied before the succeeding reset pulse by a time interval that is considerably greater than the relay chatter period, it is impossible for a message unit pulse to set a core immediately prior to the application of a reset pulse.

Thus, it is one feature of this invention to provide means for setting any core in the matrix array only subsequent to the application of a scanning reset pulse to the core.

Although this sequence of pulses solves the relay chatter problem it is most desirable to avoid the necessity of providing separate bias pulse means for each core. For this reason in the illustrative embodiment of our invention the cores are arranged in rows and columns and an entire row of cores is scanned at one time. An additional row of buffer cores is provided, each one of these buffer cores being coupled to every core in a different column of the array. The reset pulse is applied to a row conductor and resets all cores in the row to which message unit pulses are not applied. As hereinbefore stated, it is necessary to limit the reset pulse magnitude to a value insufficient to reset a core in the presence of a message unit pulse in order that the core not be set and reset many times for the same message unit. Any core to which a message unit pulse is applied is reset by a succeeding reset pulse, the first one occurring after the termination of the message unit pulse.

The reset pulse switches the magnetization of all cores set by priorly applied message unit and bias pulses and to which message unit pulses are not then applied. The flux reversals induce voltages in the column conductors which set the respective buffer cores. The scanning circuit then scans the buffer cores to determine which subscribers, represented by the previously set cores in the row, are to be billed message units. After buffer core scanning another reset pulse is applied to the succeeding row of the array.

In this manner all the cores in a row may be reset by applying a single scanning pulse to the row conductor. Thus, in a similar fashion a single bias pulse can be applied to a row conductor some time after the reset pulse, which in coincidence with whichever message unit pulses are being applied, set the associated cores. It is not necessary to provide individual bias pulse means for every core in the array. All cores in an entire row may be biased simultaneously and by the same bias pulse means.

Another feature of this invention is to provide means for inhibiting the resetting of any core in the matrix array prior to the termination of the setting message unit pulse applied to said core.

Another feature of this invention is the provision of means for resetting an entire row of magnetic cores in a matrix array with a single scanning pulse.

Still another feature of this invention is the provision of a row of buffer cores and means for transferring information in any one row of the array to the row of buffer cores upon the application of the single scanning pulse to said one row.

It is another feature of this invention to provide means for scanning the row of buffer cores between successive row scans.

It is still another feature of this invention to provide means for applying a bias pulse to an entire row in the array immediately subsequent to its scan for setting those cores in the row to which message unit pulses are applied.

A complete understanding of this invention and of the various features thereof may be gained from consideration of the following description and the accompanying drawing, in which:

FIG. 1 shows an illustrative embodiment of the invention; and

Figure 2:
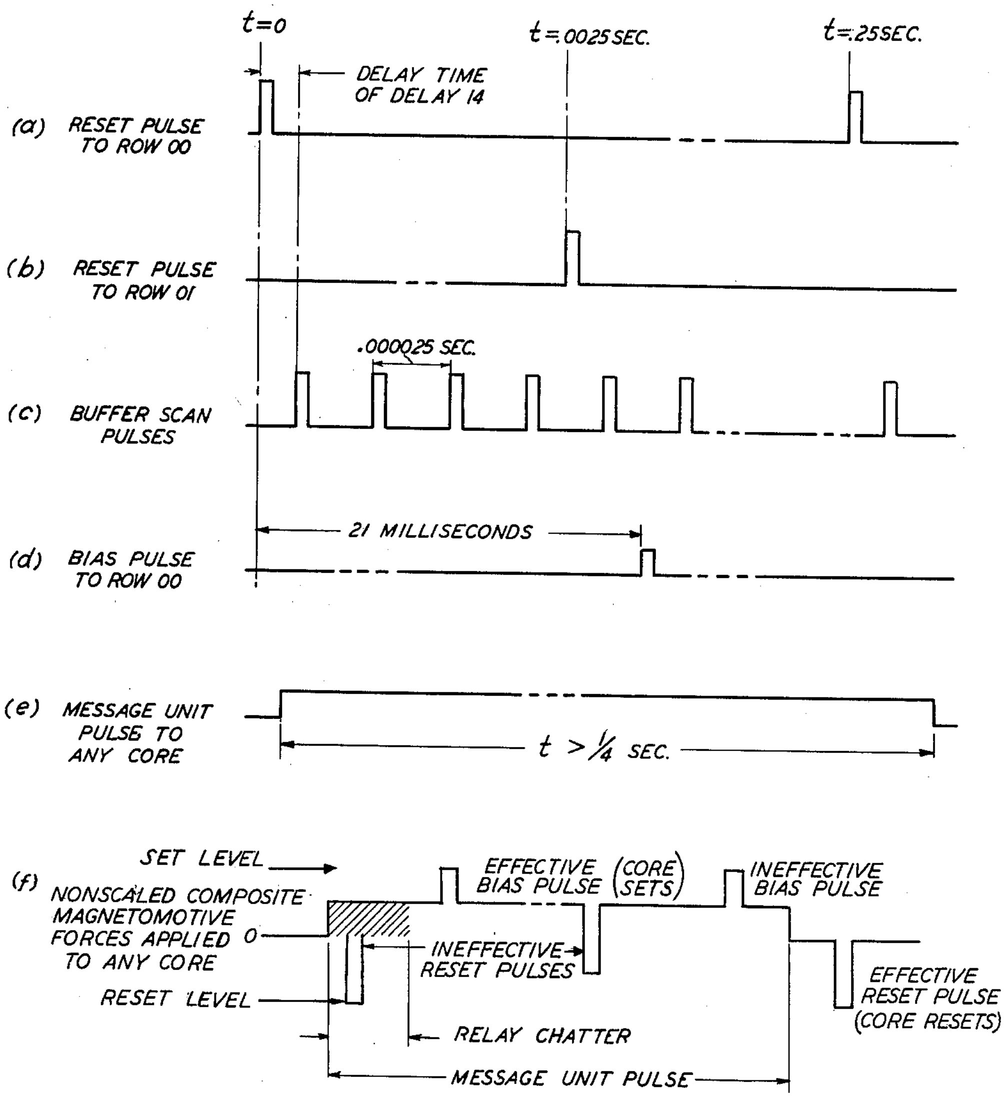

FIG. 2 discloses a timing sequence of the various pulses applied to the array in FIG. 1.

*General Description*

Referring now to FIG. 1 the cores in matrix 40 represent different telephone subscribers. When a particular subscriber is to be billed one unit the central office equipment applies a relatively long message unit pulse to the respective conductor 22. This pulse applies a clockwise magnetomotive force to the core but is insufficient in magnitude to set the core magnetization. It is only when a bias pulse is subsequently applied to the core that the magnetization is set in the clockwise direction.

The scanning circuit scans an entire row at one time. The reset pulse is applied to a particular one of conductors 20 in a direction to switch the magnetization of every core in the row to the counterclockwise direction. The reset pulse is insufficient in magnitude to switch those cores to which the oppositely directed setting magnetomotive forces are applied. However, the reset pulses are sufficient to switch the magnetization state of those cores which have been set by the prior coincidence of bias and message unit pulses and whose message unit pulses have terminated. These cores when switching magnetization state to the counter-clockwise direction induce voltages in conductors 26 which set the magnetizations of the respective buffer cores 27 in the clockwise direction.

The magnetizations of the buffer cores are normally in the counterclockwise direction and only those cores in the buffer row coupled to cores in the scanned row representing subscribers to be billed are switched to the clockwise direction. The scanning circuit then scans the buffer cores and determines which particular subscribers in the scanned row are to be billed. In the process of scanning the buffer cores their magnetizations are reset to the counterclockwise direction. After the last buffer core is scanned a row reset pulse is applied to the conductor 20 coupled to all cores in the next row. This process continues until the last row of cores is scanned whereupon the scanning circuit reinitiates a cycle by interrogating the first row once again.

The message unit pulses applied to the respective cores are insufficient in magnitude to set clockwise magnetizations in these cores. These pulses are limited in magnitude to inhibit the setting of cores because of possible erroneous double billing due to relay chatter. It has been explained above that a frequent problem in magnetic core matrices of this type is that if the setting pulses have a long duration it is possible for the cores to be set by the message unit pulses, reset by the scan pulses, set once again by the message unit pulses and so on. To avoid corresponding multiple billing of the same subscriber the reset pulses are limited in magnitude. These latter pulses are capable of resetting the matrix cores but only in the absence of message unit pulses. In this manner, the cores are not reset until after termination of the setting pulses and the subscribers can be billed only once for each message unit pulse—after its termination.

However, when the message unit pulses are first applied the relay chatter for the first ten milliseconds causes them to be applied in a discrete fashion. If during one of the small intervals within this ten milliseconds when the relay contacts supplying the message unit pulses are disconnected the reset pulse were to be applied, the immediately previously set core would be reset. This is due to the fact that in the absence of message unit pulses the reset pulses are sufficient to reset the cores. After the reset pulse has terminated and when the relay contacts connect once again within the first ten milliseconds the message unit pulse sets the core for a second time. After the message unit pulse has terminated the subscriber will be billed for a second time when the scanning pulse resets the core.

To obviate this double billing without necessitating the inhibiting of the scanning circuit for approximately ten milliseconds upon the application of any message unit pulse, the message unit pulses are purposely made insufficient in magnitude to set the cores. Subsequent to the application of the counterclockwise magnetomotive force reset pulse to the row a clockwise magnetomotive force bias pulse is applied to the conductor 19 coupled to all cores in the priorly scanned row. This bias pulse is also insufficient in magnitude to set the cores but in coincidence with any applied message unit pulses set the respective cores in the row. Thus, the cores can only be set during the application time of the bias pulse which occurs after the reset pulse and precedes the next reset pulse to the same row by some time less than the full scanning period. Thus, even were a message unit pulse to be applied simultaneously with the bias pulse and the core were set when the relay contacts first connected to each other at the beginning of the relay chatter period it is impossible for the core to be reset before the relay chatter has terminated. The next reset pulse is not applied until the relay chatter has completely subsided. If the message unit pulse, on the other hand, is applied after the bias pulse, again there is no chance for the reset pulse to reset the core during the relay chatter period. This is due to the fact that the core is not set in the first place by the message unit pulse, the setting of the core taking place only when the next bias pulse is applied.

In FIG. 1 the bias pulse is applied to an entire row by the incorporation of delay 18 connected to conductor 19. The pulse applied to conductor 20 which resets the cores in the row is applied to conductor 19 after passing through delay 18 and biases all cores in the row a moment later. Although the same polarity pulse is necessarily applied to both conductors the reset and bias magnetomotive forces are in opposite directions as desired due to the opposite directions of the threadings of these conductors through the cores.

The reset pulse magnitude must be sufficient to switch the magnetizations of the cores while the bias pulse must be incapable of doing so alone. The bias pulse magnitude is advantageously limited in FIG. 1 by merely providing an attenuation factor in delay 18.

In this manner the scanning process is continuous and need not be inhibited each time a message unit pulse is applied to a core in the array. Erroneous billing due to relay chatter is avoided by automatically precluding the application of a reset pulse to a core being set during the relay chatter period until the relay chatter has completely subsided.

The operation of the circuit can be summarily described with reference to all of the pulse waveforms shown in the nonscaled timing sequence of FIG. 2. FIG. 2(*a*) shows the reset pulses applied to row 00, separated by the scanning period of one-quarter second. FIG. 2(*b*) shows the reset pulses applied to row 01 which occur .0025 second after the pulses applied to row 00.

FIG. 2(*c*) discloses the application times of the buffer scan pulses. There are 100 buffer scan pulses for each reset pulse. The first of each 100 buffer scan pulses occurs at a time after the reset pulse that is equal to the delay introduced by delay 14. This delay is necessary to permit the buffer cores to completely switch before they are scanned as explained below.

The bias pulse to row 00 of FIG. 2(*d*) occurs 21 milliseconds after the reset pulse to the same row; the choice of this time interval is likewise explained below. Similar remarks apply to the bias pulses applied to the other 99 rows. It is observed from the figure that by the time the bias pulse is applied a considerable number of buffer cores have already been scanned. This is permissible as there is no functional relationship between buffer scanning and information storage into the matrix cores. The buffer cores are scanned while information is being written into the matrix cores. The only limitation on the application time of the bias pulse is that it occur more than 10 milliseconds after the reset pulse to the same row and not be simultaneous with the reset pulse applied to any other row.

The message unit pulses of FIG. 2(*e*) occur at random times. Their width, *t*, must be greater than the scanning period, one-quarter second. Since a message unit pulse can set a matrix core only with a coincident bias pulse that occurs every one-quarter of a second, to insure that a message unit pulse applied after a bias pulse will set a core it must persist until the next bias pulse, one-quarter second later, is applied.

In FIG. 2 the reset and buffer scan pulses each have twice the magnitude of the bias and message unit pulses. This is because the former individually switch the magnetization of the cores to which they are applied while the latter do so only when they are coincident with each other.

In FIG. 2(*f*) the composite magnetomotive force applied to any matrix core is shown as a function of time. The time scale is more compressed than that of FIGS. 2(*a*)–2(*e*) so that three successive reset pulses may be shown. The duration of the message unit pulse is close to half a second. Its magnitude is insufficient to set the core to which it is applied. For this reason, the first reset pulse, which in the example chosen is applied during the relay chatter period, is ineffective. Although it is sufficient in magnitude to reset a core and would indeed do so if applied when the message unit pulse is at a zero level during parts of the chatter period, it cannot reset the core because the core was never set in the first place. The core is first set by the bias pulse occurring 21 milliseconds later as shown.

The next reset pulse is ineffective because it is applied together with the message unit pulse and the composite magnetomotive force is less than the "reset level."

The second bias pulse is likewise ineffective because the core is still in the set condition as a result of the first bias pulse.

The third reset pulse, applied after an effective bias setting pulse and after the termination of the message unit pulse resets the core and bills the subscriber one message unit

DETAILED DESCRIPTION (*a*) *Structure*.—The central office, in conjunction with which the illustrative embodiment of this invention is utilized, serves 10,000 subscribers. Conventionally, this central office equipment applies pulses to 10,000 respective message unit leads which cause respective message registers to step their count by one unit upon the occurrence of each pulse. In the instant invention an individual magnetic core rather than a message register is associated with each subscriber. These cores are arranged in 100 rows and 100 columns in matrix 40. Each core is designated by a four-digit number, the first two digits representative of the row and the second two of the column in which the core resides. Each message unit lead 22 passes through only one core and is connected to ground. The cores are of the kind having two remanent magnetization states that have found increasingly widespread use in recent years. The pulses applied to the message unit leads apply magnetomotive forces to respective cores in a clockwise direction.

A relay 23 with contacts 24 and 25 is associated with each of the 10,000 message register leads. In FIG. 1 only the relay associated with core 00,99 is shown. When this relay is operated, contacts 24 and 25 connect positive source 30 to conductor 22 associated with core 00,99. The current flowing through conductor 22 applies a clockwise magnetomotive force to the core. This magnetomotive force, however, is insufficient in itself to effect the switching of the flux in the square hysteresis loop material of the core. The magnitude of the message unit pulse shown in FIG. 2(*e*) is below the "set level" of FIG. 2(*f*). Resistor 79, in series with conductor 22, limits the current supplied by source 30. This resistor prevents core 00,99 from having its magnetization state switched when relay 23 operates. The bias pulse of FIG. 2(*d*) on conductor 19 must be applied simultaneously with the message unit pulse to set an individual core. The combined magnetomotive force magnitude of these two pulses exceeds the "set level" of FIG. 2(*f*). The origin of this bias pulse and its time of application will be described in detail below.

The cores of matrix 40 are scanned by a scanner circuit comprising clock oscillator 50, frequency divider 51, ring counters 3 and 4, and the 100 AND gates 17. Clock oscillator 50 applies pulses at the rate of 40,000 pulses per second to frequency divider 51. Frequency divider 51 applies pulses to the input of ring counter 3 at a rate of 400 per second. The pulses applied to ring counter 3 cause succeeding stages of the counter to be energized with corresponding signals placed on the respective leads 6. The count advances from 0 to 9 and back to 0 once again, 40 complete cycles occurring every second.

Ring counter 40 is similar to ring counter 3 except that the advance pulses originate from stage 9 of ring counter 3 rather than from the pulses supplied by frequency divider 2. Thus, ring counter 4 counts at a rate one-tenth that of ring counter 3. A signal is placed on the lead 7 associated with the energized stage. The period of operation of ring counter 4 is one-quarter second.

Each AND gate 17 is of the kind in which a pulse is applied to the output lead 20 only if signals are placed on the two input leads 6 and 7. There are 100 of these AND gates, the output leads, designated 00 to 99, being associated with respective ones of the 100 rows of matrix 40. Only one of the AND gate outputs is pulsed at one time. Initially, the 0 stages of both ring counters are energized. The 00 AND gate is the only one of the 100 gates having signals applied to its two inputs. Consequently, the 00 conductor is the only conductor 20 to which a pulse of current is applied. When the first frequency divider pulse advances the count of ring counter 3 by one unit, and AND gate associated with the 01 conductor 20 (not shown in the figure) applies a current pulse to this conductor. Upon the application of the ninth oscillator pulse, AND gate 09 is operated. The tenth oscillator pulse causes the count of ring counter 4 to be advanced to the one stage and the count of ring counter 3 to recycle to the 0 stage. AND gate 10 (not shown) is operated. This sequence continues until the one-hundredth pulse resets both counters to the 0 stage, a current pulse is applied to the 00 conductor 20, and the counting cycle resumes once again.

Conductors 20 pass through the 100 cores in the respective rows of matrix 40 and are terminated at ground. Currents flow from ground through these conductors to AND gates 17. These currents, passing through the aperture of each core in the respective rows, apply counterclockwise magnetomotive forces to all cores in the rows. Each magnetomotive force in itself is sufficient for resetting the flux in the cores in a counterclockwise direction. There is a flux reversal, however, only in those cores whose fluxes have been set in the clockwise direction by the prior coincident application of message unit and bias pulses.

If the scanning pulse is applied simultaneously with message unit pulses to some cores in the row, these cores are not reset by the reset pulse on conductor 20. The second reset pulse in FIG. 2(*f*) when applied with the message unit pulse as shown produces a total magnetomotive force that is less than the "reset level." The magnetomotive forces applied to the cores by the currents in conductors 20 and 22 oppose each other and, consequently, there is no flux reversal during the simultaneous application of message unit and reset pulses. Although resistor 79 limits the magnitude of the message unit pulse so that it does not set core 00,99 by itself, resistor 79 is nevertheless small enough to allow a message unit pulse of sufficient magnitude to prevent core 00,99 from being reset by a reset pulse applied simultaneously with it. A core to which a message unit pulse is being applied is not switched and therefore not scanned by the reset pulse until after the message unit pulse has terminated as illustrated by the third "effective" reset pulse of FIG. 2(*f*). This prevents successive settings and resettings of the same core for a single message unit pulse.

There are 100 of the cores 27 arranged in a buffer row, each core being inductively coupled by a respective one of conductors 26 to all cores in a particular column. Assume, for example, that the scanning circuit applies a current pulse to the 00 conductor 20 and that core 00,00 has been previously set by a message unit and a bias pulse. The flux in this core is, consequently, reversed from a clockwise to the counterclockwise direction provided that the message unit pulse has terminated. This flux reversal causes an induced current to flow in the associated conductor 26 in the downward direction. This current flows as diode 28 is poled in the downward direction and sets the flux in the core 27 associated with column 00 in the clockwise direction.

The message unit and bias pulses themselves when setting the matrix cores do not cause flux changes in cores 27 due to the incorporation of diodes 28. These pulses cause induced voltages in conductors 26 which would produce current flow in the upward direction. These currents are blocked by diodes 28.

Because one of conductors 20 passes through all cores in each row, all cores in the scanned row that have been set by bias and terminated message unit pulses are switched by the scanning pulse. As each core in the row is inductively coupled to a respective one of the 100 buffer cores 27, all cores in the scanned row which had been set cause clockwise fluxes to be set into respective buffer cores. Effectively, the row information is transferred to the row of buffer cores. Each of these cores in the matrix row is now in the reset condition and can be set by the application of new message unit pulses.

The buffer cores are scanned by a scanner similar to the one used for the core matrix interrogation. Clock oscillator 50 applies pulses to the delay 14 at a 40 kc. rate. These pulses operate ring counters 15 and 16 in a manner similar to the operation of ring counters 3 and 4 by the pulses from frequency divider 51. Gates 29 are similar to gates 17 and cause sequential currents to flow in conductors 40. As there is no 1:100 frequency divider interposed between clock oscillator 1 and ring counter 15, ring counters 15 and 16 cycle at a rate 100 times greater than that of ring counters 3 and 4. Thus, the 100 AND gates 29 cycle at a rate 100 times greater than that of gates 17. AND gates 29 draw current from ground through conductors 41 causing cores 27 to reset. The entire row of 100 buffer cores is interrogated between successive transfers of row information from matrix 40 to the buffer cores. This results from the faster operation of ring counters 15 and 16.

Delay 14 is interposed between clock oscillator 1 and ring counter 15 to permit the row pulse on conductor 20 to transfer the row information to the buffer cores before buffer or column scanning ensues. The delay need be a few microseconds only as magnetic cores switch magnetization state rapidly.

Current is drawn from ground through each conductor 41 to a respective AND gate 29. This current applies counterclockwise magnetomotive forces to cores 27. There is a flux reversal, however, only in those cores which have been set in a clockwise direction by the application of the row scanning pulse. If the flux in one of cores 27 reverses, a voltage is induced in conductor 31 which causes a current to flow from right to left. This current flows through diode 42 and opens gates 9, 10, 11, and 12. Diode 42 is inserted in the circuit to prevent current flow when the fluxes in cores 27 are switched to the clockwise direction by the application of row scanning pulses to cores set by bias and terminated message unit pulses.

The ten stages of ring counter 3 are connected to ten respective inputs of gate 10. Similar remarks apply to ring counters 4, 15 and 16, and gates 9, 11, and 12. As only one stage of each ring counter is energized at one time, only one input of each of the four gates is energized at any one moment. The applications of the triggering pulses, the induced voltage on conductor 31, causes the output lead corresponding to the energized input lead of each gate to control the recording of the respective digits on the magnetic tape.

(*b*) *Operation.*—As a specific example, assume that core 09,09, core 09,63 and core 09,72 in row 09 have been set by message unit pulses. Assume further that the message unit pulses that have set cores 09,09 and 09,72 have terminated while the setting pulse applied to the conductor 22 passing through core 09,63 has not yet terminated. The application of a reset pulse to conductor 20 passing through the cores of row 09 reverses the flux in only the tenth and seventy-third cores of this row. The reset pulse has no effect on core 09,63 as an oppositely directed magnetomotive force due to the setting pulse is still applied. This core will be reset during a subsequent scan and the subscriber will be charged at this time.

The switching of the flux in cores 09,09 and 09,72 to the counterclockwise direction causes a current to flow down the tenth and seventy-third ones of conductors 26. These currents switch the flux in the tenth and seventy-third buffer cores to the clockwise direction. The one hundred buffer scan pulses are then applied. These pulses, sequentially applied to the 100 buffer cores affect no cores other than the tenth and seventy-third cores. When the tenth pulse is applied to the tenth conductor 41 due to the energization of stage 0 of ring counter 15 and stage 9 of ring counter 16, the flux in the tenth core 27 is switched back to the normal counterclockwise direction. This causes an induced voltage in conductor 31 which is applied to the four triggering terminals of gates 9–12.

As the row pulse was applied to row 09, input 0 of gate 9 and input 9 of gate 10 are energized. Similarly, energized stage 0 of ring counter 15 is connected to stage 0 of gate 11 and energized stage 9 of ring counter 16 is connected to stage 9 of gate 12. The triggering pulse thus causes the number 0909 to be recorded on the magnetic tape. Subscriber 09,09 has been billed one message unit.

The succeeding buffer pulses have no effect as the corresponding buffer cores have not been set by the reset row pulse. The seventy-third pulse, however, applied to the buffer core associated with core 09,72 of matrix 40 switches the flux in this core and causes triggering of the four gates 9–12. Digits 0 and 9 are again the first two digits recorded on the magnetic tape as stages 0 and 9 of respective ring counters 3 and 4 are still energized. The digits recorded by the triggering of gates 11 and 12 are respectively 7 and 2 as stage 7 of ring counter 15 and stage 2 of the ring counter 16 are now energized.

After the one-hundredth buffer scanning pulse is applied to the one-hundredth core the next row scanning pulse is applied. Row 10 is now scanned.

The mesage unit pulses in themselves have been described as incapable of setting cores 21. A conductor 19 passes through all cores in each of the 100 rows in a direction opposite to that of conductors 20. A pulse is applied to delay 18 simultaneously with the pulse applied to conductor 20. Delay 18 delays the application of the pulse to conductor 19 until after the pulse applied to conductor 20 has terminated. This pulse on conductor 19 is in a direction from right to left and like the message unit pulses causes a clockwise magnetomotive force to be applied to cores 21. Like the message unit pulses the pulse applied to conductor 19 is insufficient to switch cores 21. Delay 18 attenuates the output pulse from gate 17 and thus while the reset pulse is sufficient to reset the cores, the bias pulse alone cannot set them. This attenuation is necessary for the bias pulse alone on conductor 19 should not set cores 21. The combination of the bias pulse on conductor 19 and the message unit pulse applied to any core in the row is sufficient, however, to switch the flux in the core to the clockwise direction as shown in FIG. 2(*f*). In this manner, the message unit pulse sets the matrix core.

Because setting of the matrix cores requires the application of the bias pulses to conductors 19 and these pulses are not applied until after the row scans, the cores may not be set until subsequent to the row scans. The relay chatter problem is solved for the relay chatter subsides before the core is next scanned. No subscriber core can be set, scanned during the relay chatter period when contacts 24 and 25 are disconnected, and set once again when the contacts close, because the relay chatter completely subsides before the core is reset by the scanning circuit. This is illustrated in FIG. 2(*f*) where it is shown that even if a reset pulse is applied during the relay chatter period (shaded portion) double billing is avoided. The core has not been previously set and, therefore, can not be reset now. It is set only by the first bias pulse applied immediately after the reset pulse as shown in the figure.

It should be noted that while the bias pulse applied to conductor 19 occurs after the pulse applied to the associated conductor 20 it is, nevertheless, not applied simultaneously with the row reset pulse on conductor 20 of a succeeding row. The reset pulses on conductors 20 cause induced voltages in conductors 26 which set the buffer cores. Although the setting of a matrix core by message unit and bias pulses does not cause a flux reversal in the associated buffer core due to the incorporation of diodes 23 it is, nevertheless, possible for the voltage induced in a conductor 26 from the setting of a matrix core by a message unit pulse to mask the voltage induced in the same conductor 26 by the reset pulse applied to another row. This would prevent switching of the associated buffer core. For this reason it is necessary to apply the bias pulse to conductor 19 between successive reset pulses to any of the rows. Delay 18 is adjusted to meet this requirement, that is, it is not equal to an integral multiple of .0025 second, the time interval between successive reset pulses.

In addition to providing for the bias pulses to occur between successive row scans it is also necessary to delay their application by more than 10 milliseconds after the respective reset pulses. The relay chatter can also cause erroneous billing at the termination of the message unit pulse. When the pulse terminates, the relay contacts once again bounce back and forth. If after they momentarily disconnect from each other the reset pulse is applied, the flux in the core is switched. This results because the magnitude of the reset pulse on conductor 20 is sufficient for switching the state of any core in the row in the absence of message unit pulses. If immediately after the reset pulse switches the core contacts 24 and 25 again connect to each other the message unit pulse is applied once again. If at this time the bias pulse were to be applied on conductor 19 the core would be set once again with the consequent double billing of the subscriber.

The relay chatter persists for approximately 10 milliseconds. If the bias pulse on conductor 19 is delayed by delay 18 for a time greater than 10 milliseconds, for example 21 milliseconds, as in the illustrative embodiment, this second type of erroneous billing will not occur. If the message unit pulse is not terminated the reset pulse cannot switch the core. If the message unit pulse is terminating and the reset pulse does switch the core the relay chatter subsides within the next 10 milliseconds. Thus, when the bias pulse is applied after 21 milliseconds the relay chatter no longer causes the application of the message unit pulse and the core is not set a second time.

A 21-millisecond delay is chosen in the illustrative embodiment as it is both greater than 10 milliseconds and it is also not an integral multiple of .0025 second.

It is seen that with our scanning circuit the scanning period may be appreciably reduced. It is no longer necessary to inhibit the scanning operation during the application of message unit pulses for it is impossible for the relay chatter to cause erroneous double billing to the subscribers. This problem has been avoided by providing means for permitting the setting of the matrix cores by the message unit pulses only immediately subsequent to the respective row scans.

Although one illustrative embodiment of our invention has been described with a certain degree of particularity, it is to be understood that the present disclosure has been made only by way of example and that numerous changes and variations in the combination and arrangements of component elements may be resorted to without departing from the spirit and scope of the invention.

What is claimed is:

1. In a telephone system, a usage register comprising a matrix array having a plurality of magnetic cores arranged in rows and columns, a plurality of means each connected to a respective one of said cores for setting said cores to represent charges to the subscribers served by said telephone system, intermediate storage means, means for resetting all cores in any of said rows simultaneously and for resetting said rows of cores sequentially, means for transferring the information in any of said rows to said intermediate storage means in response to the resetting of said cores, means for scanning said intermediate storage means, means controlled by said scanning means for recording both the row and column number of any core set by said setting means, and means for preventing the setting of said cores by said setting means except for a predetermined time interval between successive operations of said resetting means.

2. A combination in accordance with claim 1 wherein said preventing means further prevents the resetting of any one of said cores during the operation of said setting means connected to said one core.

3. In a telephone system, a usage register comprising a matrix array having a plurality of magnetic cores arranged in rows and columns, a plurality of means each connected to a respective one of said cores for setting said cores to represent charges to the subscribers served by said telephone system, intermediate storage means, means for sequentially resetting all cores simultaneously in any of said rows, means controlled by said resetting means for transferring the information in any of said rows to said intermediate storage means, means for scanning said intermediate storage means, means controlled by said resetting means and said scanning means for registering both the row and column number of any core set by said setting means, and means for controlling the setting of said cores by said setting means to occur only during predetermined intervals.

4. In a telephone system, a usage register comprising a matrix array having a plurality of memory devices arranged in a plurality of groups, a plurality of means each connected to a respective one of said devices for setting said devices to represent charges to the subscribers served by said telephone system, intermediate storage means, means for resetting all devices in any of said groups simultaneously and for resetting said groups of devices sequentially, means controlled by said resetting means for transferring the information in any of said groups to said intermediate storage means, means for scanning said intermediate storage means, means controlled by said scanning means for identifying any device set by said setting means, and means for controlling the setting of said devices by said setting means to occur only during predetermined intervals.

5. A matrix array comprising a plurality of magnetic cores arranged in rows and columns, a plurality of first conductor means each coupled to all cores in a respective one of said rows, a row of buffer cores, first means for sequentially applying currents to said first conductor means for setting said cores in a first stable state, a plurality of second conductor means each coupling all of said cores in a respective one of said columns to an individual one of said buffer cores for setting said buffer cores in a first stable state in response to the switching of said matrix cores to said first stable state, third conductor means individually coupled to said buffer cores, second means for sequentially applying currents to said third conductor means intermediate successive operations of said first sequential current applying means for setting said buffer cores in a second stable state, means for detecting the switching of said buffer cores to said second stable state, and means for selectively setting the cores in any row of said matrix in a second stable state at a predetermined time subsequent to the application of said current to said respectively coupled first conductor means.

6. A matrix array comprising a plurality of memory devices arranged in groups, a plurality of first conductor means each coupled to all devices in a respective one of said groups, a group of buffer memory means, first means for sequentially energizing said first conductor means for setting said devices in a first stable state, a plurality of second conductor means each coupling a respective one of said devices in each of said groups to an individual one of said buffer means for setting said buffer means in a first stable state in response to the switching of said matrix devices to said first stable state, a plurality of third conductor means each coupled to a respective one of said buffer means, second means for sequentially energizing said third conductor means intermediate successive operations of said first sequential energizing means for setting said buffer means in a second stable state, means for detecting the switching of said buffer means to said second stable state, and means for selectively setting the devices in any group of said matrix in a second stable state at a predetermined time subsequent to the energization of said respective first conductor means by said first sequential energizing means.

7. In a telephone system, an electronic usage register comprising a memory matrix array having a plurality of magnetic cores arranged in rows and columns, a winding uniquely coupled to each core of said matrix for each line whose usage is to be registered, relay means for applying a pulse to a winding on usage of the line associated therewith, a row of buffer magnetic cores, scanning means for applying resetting pulses to successive rows of said matrix and for applying resetting pulses successively to each buffer intermediate the application of said resetting pulses to said successive rows of said matrix, means responsive to the resetting of a matrix core in any column for setting a unique buffer core, and means for setting said cores of said matrix while preventing relay chatter in said relay pulsing means erroneously setting said matrix cores, said setting means including a plurality of bias winding means each threading a respective row of said matrix and means for applying a pulse to each of said bias winding means after said resetting pulse is applied to the same row of said matrix, each of said bias pulses and each of said relay pulses being individually insufficient to set a matrix core and said pulse from said relay pulsing means having a duration at least equal to the time for the scanning of all the rows of said matrix.

8. In a telephone system, an electronic usage register comprising rows and columns of magnetic cores arranged in a memory matrix array, said magnetic cores having a set and a reset condition, a plurality of setting means each uniquely coupled to a respective core of said matrix for each line whose usage is to be registered but being incapable of setting said cores, a row of buffer magnetic cores, means responsive to resetting of a matrix core in any column for setting a unique buffer core, scanning means for applying resetting pulses to successive rows of said matrix and for applying resetting pulses successively to each buffer intermediate the application of said pulses to said successive rows of said matrix, a plurality of bias winding means each threading a respective row of said matrix, and means for applying a pulse to said bias winding means threading any one of said rows only after said resetting pulse is applied to said one row of said matrix for aiding said setting means to effect the setting of said cores in said one row.

9. In a telephone system, an electronic usage register comprising groups of bistable devices in a memory matrix array, said devices having a set and a reset condition, a plurality of setting means each uniquely connected to a respective device in said matrix for each line whose usage is to be registered but being insufficient to set said devices, a group of buffer memory devices, means responsive to resetting of one matrix device in each of said groups for setting a unique buffer device, scanning means for applying resetting pulses to successive groups of said matrix devices and for applying resetting pulses successively to each buffer device intermediate the application of said pulses to said successive groups of said matrix devices, a plurality of bias means each connected to a respective group of devices in said matrix, and means for applying a pulse to said bias means connected to any one of said groups after said resetting pulse is applied to said one group for aiding said setting means to effect the setting of said bistable devices in said one group.

10. A scanning circuit for a matrix array having a plurality of magnetic cores, comprising means for randomly applying setting pulses to said cores, a plurality of means each coupled to all cores in a respective group of said cores for sequentially resetting groups of said cores, buffer storage means, means controlled by said resetting means for transferring the information in any of said groups of cores to said buffer storage means, means for interrogating said buffer storage means for determining which cores in said groups had been set prior to the operation of said resetting means, and a plurality of means each coupled to all cores in a respective group of said cores and operative only at a predetermined time after the operation of said resetting means on said respective group for controlling together with said random setting pulse applying means the setting of the cores in said respective group, said setting pulse applying means being further operative to prevent the resetting of said cores by said resetting means.

11. A scanning circuit for a matrix array having a plurality of bistable memory devices, comprising means for randomly applying setting pulses to said devices, a plurality of means each coupled to all devices in a respective group of said devices for resetting said devices, buffer storage means, means for transferring the information in any group of said devices to said buffer storage means in response to the resetting of said devices, and a plurality of means each coupled to a respective group of said devices and operative only at a predetermined time after the operation of said resetting means on said respective group for controlling together with said random setting pulse applying means the setting of the devices in said respective group.

12. A writing and reading circuit for a memory element comprising means for randomly applying setting pulses to said memory element, means coupled to said memory element for resetting said memory element, a buffer storage device, means for transferring information in said memory element to said buffer device in response to the resetting of said memory element, and means coupled to said memory element and operative only at a predetermined time after the operation of said resetting means for controlling together with said random setting pulse applying means the setting of said memory element.

13. A matrix array comprising a plurality of magnetic cores having first and second remanent magnetization states, said cores arranged in rows and columns, first means for setting said cores in said first magnetization state, said first setting means including a plurality of randomly operating means each connected to a respective one of said cores and a plurality of means each coupled to all cores in a respective one of said rows, second means for simultaneously setting all cores in any one of said rows in said second magnetization state and for operating on all of said rows sequentially, temporary memory means, means for transferring the information stored in any one of said rows to said temporary memory means in response to the operation of said second setting means upon said one row, means for scanning said temporary memory means, means controlled by said scanning means for registering both row and column numbers of all of said cores set by said second setting means, and means for controlling the operation of each of said row coupled means only after an operation on the respective row by said second setting means and between successive operations of said second setting means on other ones of said rows.

References Cited in the file of this patent

UNITED STATES PATENTS

| | | |
|---|---|---|
| 2,273,165 | Wright | Feb. 17, 1942 |
| 2,776,419 | Rajchman et al. | Jan. 1, 1957 |
| 2,843,838 | Abbott | July 15, 1958 |
| 2,931,014 | Buckholz et al. | Mar. 29, 1960 |
| 2,992,416 | Sims | July 11, 1961 |
| 3,008,126 | Estrems | Nov. 7, 1961 |
| 3,046,528 | Rowe | July 24, 1962 |